United States Patent [19]

Hickl

[11] 4,363,659

[45] Dec. 14, 1982

[54] NICKEL-BASE ALLOY RESISTANT TO WEAR

[75] Inventor: Anthony J. Hickl, Kokomo, Ind.

[73] Assignee: Cabot Corporation, Kokomo, Ind.

[21] Appl. No.: 45,566

[22] Filed: Jun. 4, 1979

[51] Int. Cl.[3] .............................................. C22C 30/00

[52] U.S. Cl. ..................................... 420/454; 420/582

[58] Field of Search ............. 75/171, 170, 122, 134 F, 75/134 C; 148/32, 32.5

[56] References Cited

U.S. PATENT DOCUMENTS 3,918,964 11/1975 Baldwin et al. ....................... 75/171

4,188,209 2/1980 Kruske ................................. 75/122

*Primary Examiner*—R. Dean

*Attorney, Agent, or Firm*—Jack Schuman; Joseph J. Phillips

[57] ABSTRACT

A nickel-base alloy resistant to wear is disclosed. The alloy contains as its principal elements chromium, molybdenum, silicon, boron and carbon. The alloy, when composed of the elements in the proportions as taught, provides an outstanding combination of engineering properties including abrasive and adhesive wear, corrosion resistance, hot hardness and impact strength. This combination of properties is essential when the alloy is used in certain suggested forms including internal combustion engine parts, fluid valve parts, gas and steam turbine parts and chain saw guide components.

9 Claims, No Drawings

NICKEL-BASE ALLOY RESISTANT TO WEAR

This invention relates to wear-resistant nickel-base alloys and more particularly to nickel-base alloys containing a minimum content of cobalt, tungsten and iron.

Cobalt-base alloys have inherent excellent resistance to wear. However, because of uncertain availability and high costs of cobalt, industry has been compelled to find alternate metals to perform this service.

Many nickel-base alloys have been developed especially and designed to have a high degree of resistance to wear.

Table 1 lists a number of representative patents and commercial alloys for use in wear conditions. All compositions given in this specification and in the claims are in percent by weight (wt/o) unless otherwise specified.

The nickel-base alloys in the art do not meet all the needs of the industry because of many deficiencies in wear and mechanical properties when nickel alloys are compared to cobalt alloys. For this reason, many nickel-base alloys must be designed to meet these needs. The differences among new nickel-base alloys may be slight, or even subtle, as they often must be developed to possess certain combinations of properties as required under specific conditions of use.

The cobalt alloys contain effective amounts of chromium and tungsten to provide the desirable wear properties. Now we find the problem is further complicated by the high costs and short supply of tungsten which must be imported, resulting in an unfavorable foreign trade status. Thus, there is an urgent need for wear-resistant nickel-base alloys that are essentially tungsten free or may contain a minimum content of tungsten.

Alloys in the prior art have been designed to provide or enhance certain specific properties by variations in composition. U.S. Pat. No. 4,118,254 provides a low melting point (approximately 1300° to 1350° C.) in an alloy together with corrosion and wear resistance. U.S. Pat. No. 4,113,920 discloses a metal powder mixed with a matrix alloy to provide a composite alloy for coating a tool. U.S. Pat. No. 4,075,999 discloses a nickel-base alloy containing chromium, carbon and molybdenum for use as a coating on high temperature resistant articles. U.S. Pat. No. 4,130,420 discloses a nickel-chromium-base alloy containing tungsten, cobalt and molybdenum especially resistant to erosion by molten glass. U.S. Pat. No. 4,093,454 relates to a process for making sintered articles from a nickel-base alloy containing chromium, tungsten and cobalt.

Each of the prior art alloys listed in Table 1 generally is characterized by a high degree of hardness; however, not all of the prior art alloys possess good hot hardness properties. Many of these alloys possess little or no ductility limiting their use to applications that do not result in high impact or high levels of tensile stress. Because of the various compositions, the prior art alloys vary in degree of corrosion resistance under a variety of corrosive media. Furthermore, the degree of wear resistance of the prior art alloy may vary depending upon the type of wear experienced, i.e., abrasive or adhesive wear.

Alloys of the prior art cited above generally contain, in appreciable amounts, one or more of the metals cobalt, tungsten, molybdenum and others. These metals have become extremely costly and/or are in short supply because of their strategic classification.

Each of the prior art alloys is generally characterized by one or two outstanding engineering properties - for example, high room temperature hardness, hot hardness, corrosion resistance or impact strength.

The problem of wear in industrial and commercial articles has become more publicized in recent years. We have now become more aware of the need for alloys that resist the various types of wear. Until recently, it was generally established that hardness alone was the measure of wear. A hard material was presumed to be a wear-resistant material. The harder the material, the more wear resistance. This belief has been overcome as a result of new wear testing procedures that have been developed. It was found necessary to test a variety of types of wear, for example, adhesive and abrasive wear. Furthermore, some alloys may resist adhesive wear but not abrasive wear, and, of course, the reverse may be true. Adhesive and abrasive wear tests will be described hereinafter.

It is a principal object of this invention to provide nickel-base alloys that possess excellent wear properties.

It is another principal object of this invention to provide wear-resistant nickel-base alloys that may optionally contain a minimum amount of tungsten.

It is still another object of this invention to provide wear-resistant nickel-base alloys that possess a desirable combination of engineering properties, including impact strength, corrosion resistance and hot strength.

These and other objectives are provided by the alloys of this invention as shown in Tables 2 and 3. Table 2 discloses the ranges of composition of the alloy of this invention. Table 3 lists the compositions of alloys prepared and tested as examples of this invention.

The alloy of this invention contains essentially nickel, chromium and molybdenum, together with a critical balance of boron, carbon and silicon. These elements are present for characteristics well known in prior art alloys of this class as shown in Table 1. The gist of this invention resides, however, in the critical proportions of the elements within the ranges as shown in Table 2. Certain elements such as tungsten, manganese, iron, copper and cobalt may be present within the ranges indicated as adventitious elements normally found in this class of alloys, or may be added for certain benefits as may be desired. As indicated, the balance is nickel and the usual impurities associated with alloys of this class. These impurities include phosphorus, sulfur and the like. These elements must be kept as low as possible in content.

It was discovered that, in order to obtain the alloy of this invention in various useful forms, some modifications of composition within the ranges are suggested. For example, in Table 2, typical range "A" is preferred when the alloy is to be produced in the form of castings, i.e., cast weld rods, etc. The carbon-to-boron ratio is preferably approximately 2 to 1.

Typical range "B" is preferred when the alloy is produced in the form of tube wire, also known as cored wire, inter alia. The alloy is (1) prepared as metal powder, (2) enclosed in a metal (usually predominantly nickel) sheath, and (3) the filled Sheath (tube) is then reduced to the desired weld wire size. Alloys 1695, 1695-7 and 1695-7A, disclosed in Table 3, were produced in the form of tube wire. Note these alloys have somewhat similar hardness, regardless of the carbon-to-boron ratio.

The data obtained by a number of testing methods, as described hereafter, clearly show the alloy of this invention has a very valuable combination of engineering properties. These properties include hot hardness, corrosion and impact resistance, and abrasive and adhesive wear resistance. These properties are required especially for articles for use as chain saw guide parts, fluid valves, internal combustion engine valves and other components, gas and steam turbine parts, and the like.

The abrasive wear test, as discussed herein, was conducted with the use of a dry sand wear test unit as described in the "ASME 1977 Proceedings", Wear of Materials, Page 77, ASME, 345 East 47th St., New York, N. Y. 10017. Briefly, in this test, the specimen is forced against a rotating rubber wheel while dry sand is fed between the specimen and the wheel. Metal loss from the specimen surface is measured to determine wear characteristics.

The adhesive wear test, as discussed herein, was performed on a Model LFW-1 Friction and Wear Test Machine manufactured by Fayville-LaValley Corporation, Downers Grove, Ill.

The test is described in ASTM Specification No. D-2714-68. This testing process was originally known as the "Dow Corning" Wear Test. The adhesive test relates essentially to unlubricated metal-to-metal wear. Briefly, in this test, a specimen (block) is forced under various loads against a rotating metal wheel (ring). Metal loss from the wear surface is an indication of the metal-to-metal wear characteristics of the alloy tested.

Table 3 presents the compositions of example alloys of this invention together with their room-temperature hardness. The hardness values are given in Rockwell "C" scale (Rc). Samples were obtained from cast rod made from each alloy except as noted above.

Table 4 presents data obtained from corrosion tests in various corrosive media. Each alloy was obtained for these tests as a multilayer gas tungsten arc (GTA) deposit of cast rod made on a copper chill plate. The corrosion test consisted of four twenty-four hour immersions in the various media at the temperatures shown. Each value is an average of two samples. The corrosion rates are given in mils per year (mpy).

The data show the alloy of this invention, Alloy 116, is superior in corrosion resistance to the nickel-base alloys tested, and Alloy 116 compares favorably with the cobalt-base Alloy No. 6.

Table 5 presents data obtained from three tests; namely, hot hardness, abrasive wear and impact.

Hot hardness testing was conducted on Alloy 108-1 of this invention and other wear-resistant alloys. Testing was conducted in a MARSHALL Model 58-HD Vacuum Hot Hardness Testing Furnace. This standard testing procedure is described in TRANSACTIONS OF THE ASM Vol. 50 (1958), pages 830 to 837. The alloys were aspiration cast into cast weld rods and deposits were made by oxy-acetylene hardfacing process. The alloys were tested by the well-known method in a vacuum hardness testing unit using a 1590 gram load with a 136 degree sapphire indentor. Hot hardness data are reported in Table 5 showing the average hot hardness values at various temperatures in diamond pyramid hardness (DPH) numbers.

These data indicate the alloy of this invention has outstanding hot hardness properties. Hot hardness is an important wear-resistant characteristic, especially for valves.

Abrasive tests, as reported in Table 5, were made on the dry sand wear test unit as described herein. The values are given in volume loss (in $mm^3$) at 2000 revolutions. Deposits were made by oxy-acetylene and gas tungsten arc (GTA). The data show the nickel-base alloys to be generally superior; however, the alloy of this invention is superior over the cobalt-base alloy.

Impact tests were made by the well-known unnotched Charpy test method. Test samples were undiluted deposits of alloy by gas tungsten arc process. Values are given in foot-pounds of energy. The data show the alloy of this invention to be superior over the nickel-base alloys and compare favorably with the cobalt-base alloy.

Table 6 presents data obtained from adhesive and abrasive wear tests and hardness tests. In the adhesive test, the load was 90 pounds. In the abrasive test, the test was run for 2000 revolutions. The alloys tested were of generally similar compositions except for the boron and carbon contents. Note in Alloy 492, the boron is more than two times the carbon content. In Alloy 493, the boron and carbon are approximately equal. In Alloy 494, there is no boron content. In Alloy 108-2, the carbon content is about two times the boron content, as is preferred in cast alloys of this invention. The data show Alloy 108-2, with C:B about 2:1, is superior over the other cast alloys that do not have the similar carbon-to-boron relationship.

The optimum embodiment for alloys in typical range "A" of this invention will be obtained when the carbon-to-boron ratio is at or about two-to-one. The data from experimental alloys show generally that benefits of this invention are obtained when the carbon-to-boron ratio is within the range of about 4:1 and 4:3.

Alloys of this invention were produced in the form of castings, cast weld rods, tube wire, sintered metal powder parts, and metal powder. There appears to be no problems in producing the alloy of this invention by any of the processes known in the art. It is well known that special care is required to obtain the desired "as deposited" composition of depositions made by tube wire. It is generally within the skill of the art to balance the compositions of the metal tube and the metal powder to obtain the desired combined composition of the deposits.

Alloy 196, in Table 3, was prepared in the form of powder then die pressed and sintered into a powder metallurgy (P/M) article. It is understood, however, that P/M articles may also be produced by various processes, i.e., extruding, hot isostatic pressing (HIP) and the like.

A sintered test specimen of Alloy 196 was tested for hot hardness properties. Table 7 presents the hot hardness data for Alloy 196. The data show Alloy 196 to retain a useful range of hardness at the testing temperature.

TABLE 1

COMPOSITIONS OF ALLOYS (in wt/o)

| | DISCLOSED IN U.S. PAT. NOS. | | | | | COMMERCIAL ALLOYS | | | | |
|---|---|---|---|---|---|---|---|---|---|---|
| ELEMENT | 4,118,254 | 4,113,920 | 4,075,999 | 4,130,420 | 4,093,454 | Alloy 6 | Alloy 7-11 | Alloy 40 | Alloy 28 | Alloy 26 |
| Cr | 20-35 | 25-70 | 25-40 | 36.7-40.6 | 10-35 | 30 | 27 | 10-15 | 27-31 | 25-27 |

TABLE 1-continued

| | COMPOSITIONS OF ALLOYS (in wt/o) | | | | | | | | | |
|---|---|---|---|---|---|---|---|---|---|---|
| | DISCLOSED IN U.S. PAT. NOS. | | | | | COMMERCIAL ALLOYS | | | | |
| ELEMENT | 4,118,254 | 4,113,920 | 4,075,999 | 4,130,420 | 4,093,454 | Alloy 6 | Alloy 7-11 | Alloy 40 | Alloy 28 | Alloy 26 |
| Mo | 0-5 | — | 3-12 | 5.7-6.3 | .1-20 | 1.5 max | Mo + W 10 | — | — | — |
| Si | 1-8 | — | about 1 | 1.2-1.4 | .05-1.5 | 2 max | — | 3-5 | 1.0 max | .5 max |
| C | 1.7-3.5 | 0-2 | 1-3.5 | .13-.17 | .1-3.5 | 1.4 | 2.7 | .25-.75 | 2-2.75 | 1.75-0.25 |
| B | — | 6-12 | — | — | .05-1 | — | — | 3.5-4 | — | — |
| W | 0-15 | — | — | 2.23-2.47 | .5-15 | 4.5 | Mo + W 10 | — | 14-16 | 8-9.5 |
| Fe | — | Bal | 8 max | 2.7-3.0 | .1-20 | 3 max | 23 | 3-5 | 8 max | 4 max |
| Mn | — | — | about .5 | 1-1.1 | .05-1 | 2 max | — | — | — | .5 max |
| Cu | 0-5 | — | — | — | — | — | — | — | — | — |
| Co | — | — | 5 max | 3.5-3.8 | .2-12 | Bal | Co + N: Bal | .2 | 9-11 | .3 max |
| Ti | — | — | — | — | .05-2 | — | — | — | — | — |
| Al | — | — | — | — | .1-2 | — | — | — | — | — |
| Ni | >50.0 | — | 40-70 | 42-46 | Bal | 3 max | Co + Ni Bal | Over 77.0 | Bal | Bal |

TABLE 2

| | ALLOYS OF THIS INVENTION Composition in weight percent (wt/o) | | | |
|---|---|---|---|---|
| ELEMENT | BROAD RANGE | PREFERRED RANGE | TYPICAL RANGE "A" | TYPICAL RANGE "B" |
| Cr | 24-32 | 25.5-29 | about 29 | about 27 |
| Mo | 4-10 | 4.3-8.5 | about 6 | about 6.5 |
| Si | .60-2.0 | .79-1.84 | about 1.4 | about .8 |
| C | .60-1.8 | .75-1.29 | about 1.1 | about .8 |
| B | .2-1.0 | .40-.82 | about .6 | about .7 |
| W | up to ⅓ Mo | up to ⅓ Mo | up to 3 | up to 3 |
| Fe | up to 5 | up to 3.2 | up to 3 | up to 3 |
| Mn | up to 1.0 | up to 1 | up to 1.0 | up to 1.0 |
| Cu | up to 3 | up to 3 | up to 3 | up to 3 |
| Co | up to 5 | up to 5 | up to 5 | up to 5 |
| Ni plus impurities | Balance | Balance | Balance | Balance |

TABLE 3

| | ALLOYS OF THIS INVENTION Composition, in Weight Percent | | | | | | | | | |
|---|---|---|---|---|---|---|---|---|---|---|
| ALLOY NO. | Ni | Cr | Mo | W | Fe | Co | B | C | Si | HARDNESS Rc |
| 101 | Bal | 29 | 7 | — | — | — | 0.73 | 0.70 | 1.0 | 35 |
| 493 | Bal | 28.9 | 6.6 | — | — | — | 0.62 | 0.60 | 1.20 | 29 |
| 499 | Bal | 28.4 | 6.4 | — | — | — | 0.52 | 0.70 | 1.30 | 32 |
| 108-1 | Bal | 28.7 | 5.9 | 0.1 | 0.2 | — | 0.58 | 0.75 | 1.09 | 28 |
| 108-2 | Bal | 28.7 | 5.9 | 0.1 | 0.2 | — | 0.58 | 1.15 | 1.01 | 33 |
| 108-3 | Bal | 28.7 | 5.9 | 0.1 | 0.2 | — | 0.52 | 1.15 | 1.50 | 33 |
| 108-4 | Bal | 28.7 | 5.9 | 0.1 | 0.2 | — | 0.52 | 1.15 | 1.67 | 30 |
| 108-5 | Bal | 28.7 | 5.9 | 0.1 | 0.2 | — | 0.58 | 1.20 | 1.87 | 31 |
| 108-6 | Bal | 28.7 | 5.9 | 0.1 | 0.2 | — | 0.58 | 1.19 | 1.84 | 29 |
| 116 | Bal | 28.8 | 6.5 | 0.1 | 3.2 | 0.4 | 0.45 | 1.02 | 1.28 | 28 |
| 132 | Bal | 28.8 | 5.5 | 1.1 | 2.2 | 2.4 | 0.40 | 1.20 | 0.86 | 35 |
| 8072 | Bal | 29.0 | 4.3 | 1.8 | 2.1 | 0.4 | 0.40 | 1.29 | 1.16 | 33 |
| 1695 | Bal | 29.6 | 8.5 | — | — | — | 0.53 | 0.99 | 1.42 | 36 |
| 1695-7 | Bal | 25.5 | 6.05 | — | — | — | 0.66 | 0.85 | 0.79 | 34 |
| 1695-7A | Bal | 26.2 | 5.56 | — | — | — | 0.82 | 0.80 | 0.82 | 35 |
| 195 | Bal | 28.71 | 6.27 | 1.24 | 2.24 | 2.0 | 0.57 | 1.16 | 1.75 | 35 |
| 196 | Bal | 28.98 | 4.27 | 1.75 | 2.10 | 0.35 | 0.40 | 1.29 | 1.16 | 30 |

TABLE 4

| | COMPARISON OF CORROSION RATES BETWEEN ALLOY OF THIS INVENTION AND PRIOR ART ALLOYS Corrosion Rates (mpy) | | | |
|---|---|---|---|---|
| MEDIA* | ALLOY 116 | ALLOY 6 | ALLOY 28 | ALLOY 40 |
| 10% Acetic (Boiling) | <1 | <1 | 8 | 648 |
| 30% Acetic (Boiling) | 2 | <1 | — | 665 |
| 5% $H_2SO_4$ (66° C.) | <1 | <1 | 157 | 1965 |
| 65% $HNO_3$ (66° C.) | 24 | 56 | 1185 | 1666 |
| 50% $H_3PO_4$ (66° C.) | 16 | <1 | 574 | 2665 |

*Average of two samples run: Four (24 hour) immersions

TABLE 5

ENGINEERING PROPERTY DATA FROM SELECTED TESTS

| | HOT HARDNESS TESTS (Kg/mm$^3$) | | | |
|---|---|---|---|---|
| Temp (°F.) | Alloy 108-2 | Alloy 6 | Alloy 28 | Alloy 40 |
| 800 | 365 | 300 | 475 | 555 |
| 1000 | 345 | 275 | 450 | 440 |
| 1200 | 310 | 260 | 390 | 250 |
| 1400 | 190 | 185 | 265 | 115 |

| | ABRASIVE WEAR TESTS (mm$^3$ Vol. loss) 2000 Revolutions | | | |
|---|---|---|---|---|
| Deposits Made By | Alloy 6 | Alloy 28 | Alloy 40 | Alloy 108-2 |
| Oxy-acetylene | 35 | 8 | 17 | 15 |
| GTA | 60 | 13 | 11 | 50 |

TABLE 5-continued

ENGINEERING PROPERTY DATA FROM SELECTED TESTS

| Made By | IMPACT TESTS (ft. lbs.) Alloy 6 | Alloy 28 | Alloy 40 | Alloy 108-2 |
|---|---|---|---|---|
| Unnotched Charpy | 17 | 2 | 1 | 11 |

TABLE 6

COMPARISON OF WEAR AND HARDNESS
Selected Alloys with Various Carbon-to-Boron Ratios

| | | | WEAR VOLUME LOSS ($mm^3$) | | |
|---|---|---|---|---|---|
| ALLOY | B | C | Adhesive | Abrasive | Hardness Rc |
| 8-492 | 0.84 | 0.31 | 0.08 | 79 | 34 |
| 8-493-1 | 0.62 | 0.60 | 0.25 | 57 | 29 |
| 8-494-1 | 0 | 1.26 | 0.19 | 68 | 32 |
| 8-108-2 | 0.58 | 1.15 | 0.05 | 57 | 33 |

TABLE 7

ALLOY 196 HARDNESS TEST
Test Load - 1590 Grams

| TEMPERATURE (°F.) | DPH* | ROCKWELL |
|---|---|---|
| 1400 | 162 | B-32.4 |
| 1200 | 224 | C-16.6 |
| 1000 | 245 | C-21.3 |
| 600 | 259 | C-23.8 |
| 200 | 302 | C-30.0 |
| Approx. 80 | 308 | C-30.8 |
| Approx. 80 (Kentron)** | 302 | C-30.0 |

*DPH - Diamond Pyramid Hardness Number
**Kentron - Comparative Standard Test

What is claimed is:

1. An alloy with an outstanding combination of engineering properties including impact strength, corrosion resistance, hot hardness, and abrasive and adhesive wear resistance consisting essentially of, in weight percent: chromium 24 to 32, molybdenum 4 to about 7, silicon 0.6 to 2.0, carbon 0.6 to 1.8, boron 0.2 to 1.0, tungsten up to one-half the molybdenum content, iron up to 5, manganese up to 1.0, copper up to 3.0, cobalt 0.35 to 5.0 and the balance nickel and incidental impurities.

2. The alloy of claim 1 wherein the ratio of carbon to boron is between 4:1 and 4:3.

3. The alloy of claim 1 containing chromium 25.5 to 29, molybdenum 4.3 to 7, silicon 0.60 to 1.0, carbon 0.75 to 1.29, boron 0.4 to 0.82, tungsten up to one-half the molybdenum content, iron up to 3.2, manganese up to 1.0, copper up to 3.0, cobalt 0.35 to 5.0, and the balance nickel and incidental impurities.

4. The alloy of claim 2 containing chromium about 29, molybdenum about 6, silicon about 1.0, carbon about 1.1, boron about 0.6, tungsten, iron and copper each up to 3.0, manganese up to 1.0, cobalt 0.35 to 5 and the balance nickel and incidental impurities.

5. The alloy of claim 1 containing chromium about 27, molybdenum about 6.5, silicon about 0.8, carbon about 0.8, boron about 0.7, tungsten, iron and copper each up to 3.0, manganese up to 1, cobalt 0.35 to 5 and the balance nickel and incidental impurities.

6. The alloy of claim 1 in the form of a material for use in making hardfacing deposits.

7. An article wherein at least the surface of said article is composed of the alloy of claim 1.

8. The article of claim 7 in the form of one of the group internal combustion engine part, fluid valve part, gas turbine part, steam turbine part and chain saw guide component.

9. The alloy of claim 5 in the form of tube wire.

* * * * *